United States Patent
VanAntwerp et al.

(10) Patent No.: US 11,891,037 B2
(45) Date of Patent: Feb. 6, 2024

(54) SYSTEMS, VEHICLES, AND METHODS FOR VEHICLE STABILITY CONTROL AND TRAILER BRAKE CONTROL COLLABORATION

(71) Applicant: Toyota Motor Engineering & Manufacturing North America, Inc., Plano, TX (US)

(72) Inventors: Adam VanAntwerp, Chelsea, MI (US); Corey Zwegers, Dexter, MI (US); Stephen Robertson, Surprise, AZ (US); Takayuki Goto, Yokohama (JP); Yuichi Shimizu, Okazaki (JP)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 988 days.

(21) Appl. No.: 16/263,991

(22) Filed: Jan. 31, 2019

(65) Prior Publication Data

US 2020/0247373 A1   Aug. 6, 2020

(51) Int. Cl.
| | |
|---|---|
| *B60T 13/66* | (2006.01) |
| *B60T 13/74* | (2006.01) |
| *B60T 17/22* | (2006.01) |
| *B60T 7/20* | (2006.01) |
| *B60T 8/17* | (2006.01) |
| *B60T 8/174* | (2006.01) |
| *B60T 8/1755* | (2006.01) |
| *G05D 1/08* | (2006.01) |

(52) U.S. Cl.
CPC .............. *B60T 8/1708* (2013.01); *B60T 7/20* (2013.01); *B60T 8/174* (2013.01); *B60T 8/17551* (2013.01); *B60T 13/662* (2013.01); *B60T 17/22* (2013.01); *B60T 2270/30* (2013.01); *G05D 1/0891* (2013.01)

(58) Field of Classification Search
CPC . G05D 1/0891; B60T 8/1708; B60T 8/17551; B60T 7/20; B60T 17/22; B60T 13/662; B60T 8/174; B60T 2270/30; B60T 13/745
USPC .......................................................... 701/70
See application file for complete search history.

(56) References Cited

U.S. PATENT DOCUMENTS 7,272,481 B2    9/2007  Einig et al.
8,862,357 B2   10/2014  Miyata
(Continued)

*Primary Examiner* — Abby Y Lin
*Assistant Examiner* — Hossam M El Abd Latif
(74) *Attorney, Agent, or Firm* — Dinsmore & Shohl LLP

(57) ABSTRACT

A system for controlling a trailer brake output circuit includes an electronic control unit having one or more processors and one or more memory modules. The trailer brake output circuit is configured to output a trailer brake output signal. Machine readable instructions cause the electronic control unit to: receive a signal from a vehicle stability control system indicating that a vehicle stability control flag is set, generate the trailer brake output signal in response to the vehicle stability control flag being set such that the trailer brake output signal ramps up to a target value over a predefined period of time, maintain the trailer brake output signal at the target value while the vehicle stability control flag is set, and output the trailer brake output signal such that the trailer brake output signal ramps down from the target value when the vehicle stability control flag changes from set to not set.

20 Claims, 5 Drawing Sheets

(56) References Cited

U.S. PATENT DOCUMENTS

| | | | |
|---|---|---|---|
| 9,340,228 B2 | 5/2016 | Xu et al. | |
| 9,981,542 B2 | 5/2018 | Oguri et al. | |
| 2006/0125313 A1* | 6/2006 | Gunne | B60T 8/248 |
| | | | 303/7 |
| 2013/0124058 A1* | 5/2013 | Perlick | B60T 7/20 |
| | | | 701/70 |
| 2017/0137003 A1* | 5/2017 | Grandstaff | B60T 15/04 |
| 2017/0137004 A1 | 5/2017 | Suzuki et al. | |
| 2017/0151935 A1 | 6/2017 | Prohaszka et al. | |
| 2018/0334152 A1* | 11/2018 | Hunt | B60T 8/323 |
| 2019/0299946 A1* | 10/2019 | Miller, Jr. | B60T 8/38 |
| 2021/0188229 A1* | 6/2021 | Plaehn | B60T 7/20 |

* cited by examiner

SYSTEMS, VEHICLES, AND METHODS FOR VEHICLE STABILITY CONTROL AND TRAILER BRAKE CONTROL COLLABORATION

TECHNICAL FIELD

The present specification generally relates to trailer brake control systems and, more specifically, to systems for controlling trailer brake output circuits in response to a vehicle stability control output.

BACKGROUND

Trailers (e.g., recreational trailers, utility trailers, boat trailers, semi-trailers, and the like) may be towed by towing vehicles (e.g., automobiles and trucks). Some trailers include trailer brakes that may be actuated by a trailer brake controller coupled to the towing vehicle. The trailer brake controller may control the trailer brakes via an electric-over-hydraulic trailer braking system or an electric trailer braking system.

An electric-over-hydraulic trailer braking system includes hydraulic trailer brakes and an electric-over-hydraulic brake actuator coupled to the trailer that receives electrical signals from the trailer brake controller and facilitates the application of the hydraulic trailer brakes.

An electric trailer braking system includes electric trailer brakes that are applied when the trailer brake controller provides an electric current to the trailer brakes. The electric trailer brakes typically include brake shoes that frictionally engage a drum when activated. In some electric trailer braking system, an electromagnet is mounted on one end of a lever in order to actuate the brake shoes. When an electric current is applied to the electromagnet, the lever is pivoted as the electromagnet is drawn against the rotating brake drum, thereby actuating the electric trailer brakes.

SUMMARY

In one embodiment, a system for controlling a trailer brake output circuit includes an electronic control unit having one or more processors and one or more memory modules communicatively coupled to the one or more processors. The trailer brake output circuit communicatively coupled to the one or more processors, where the trailer brake output circuit is configured to output a trailer brake output signal. Machine readable instructions stored in the one or more memory modules that cause the electronic control unit to perform at least the following when executed by the one or more processors: receive a signal from a vehicle stability control system, the signal indicating that a vehicle stability control flag is set; generate the trailer brake output signal in response to the vehicle stability control flag being set such that the trailer brake output signal ramps up to a target value over a predefined period of time; maintain the trailer brake output signal at the target value while the vehicle stability control flag is set; and output the trailer brake output signal such that the trailer brake output signal ramps down from the target value when the vehicle stability control flag changes from set to not set.

In some embodiments, a vehicle for controlling a trailer brake output circuit includes the trailer brake output circuit configured to output a trailer brake output signal and an electronic control unit. The electronic control unit is configured to: receive a signal from a vehicle stability control system, the signal indicating that a vehicle stability control flag is set, generate the trailer brake output signal in response to the vehicle stability control flag being set such that the trailer brake output signal ramps up to a target value over a predefined period of time, maintain the trailer brake output signal at the target value while the vehicle stability control flag is set, and output the trailer brake output signal such that the trailer brake output signal ramps down from the target value when the vehicle stability control flag changes from set to not set.

In some embodiments, a method of controlling a trailer brake output circuit of a vehicle includes receiving a signal from a vehicle stability control system, the signal indicating that a vehicle stability control flag is set, generating, by an electronic control unit of the vehicle, a trailer brake output signal in response to the vehicle stability control flag being set such that the trailer brake output signal ramps up to a target value over a predefined period of time, maintaining, by the electronic control unit of the vehicle, the trailer brake output signal at the target value while the vehicle stability control flag is set, and outputting, by the electronic control unit of the vehicle, the trailer brake output signal such that the trailer brake output signal ramps down from the target value when the vehicle stability control flag changes from set to not set.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include systems, vehicles, and methods for controlling trailer brake output circuits in response to a vehicle stability control output. Vehicle stability control (VSC) systems can assist with maneuvering a vehicle in situations such as, for example, oversteering (OS), turning the steering wheel suddenly, taking a turn too quickly, skidding on low friction roads such as a wet or icy road, or the like. In general, VSC systems help control side slips of a vehicle. For example, if a car or animal suddenly appears in a vehicle's path and the driver suddenly turns the wheel to avoid the car or animal, then sensors of the VSC system may detect side slip or the potential for side slip of one or more of the wheels of the vehicle and activate VSC to help control the side slip and assist the driver in maneuvering the vehicle through the sudden maneuver. Some VSC systems may precisely control the brakes of one or more vehicle wheels and in some situations adjust the output of the engine to one or more of the wheels. The precise control of the brakes and engine output to the one or more of the wheels may counteract the side slip by generating power opposite the side slip. In general, the VSC system may make the vehicle more stable during sudden maneuvers.

Figure 2:
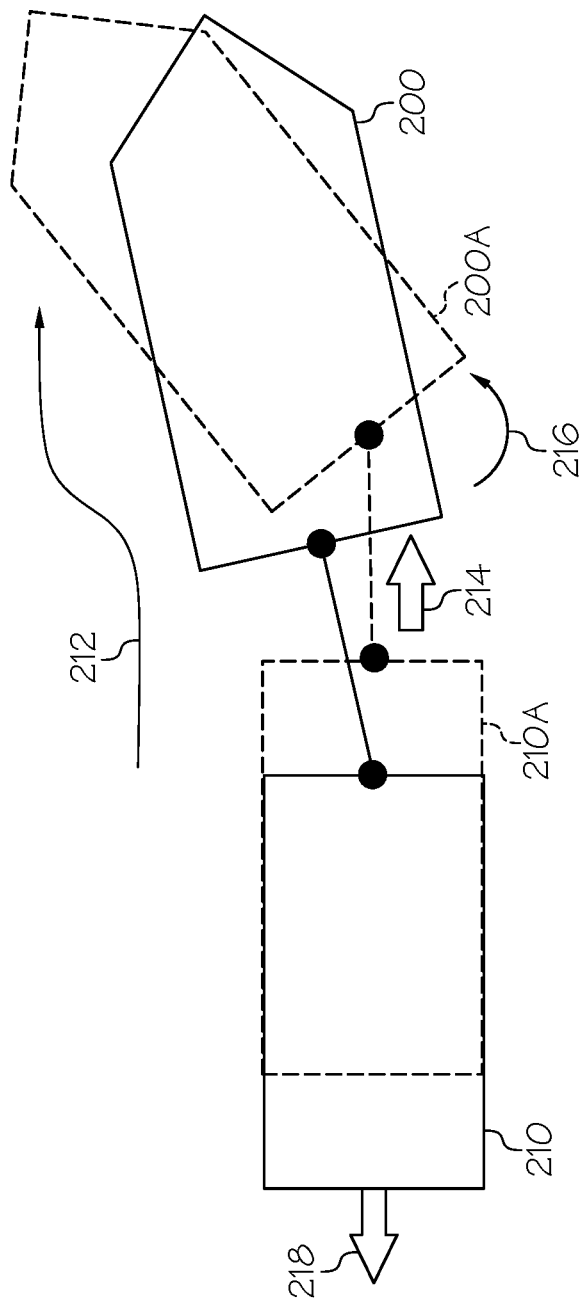
FIG. 2 schematically depicts a comparative example between a situation where trailer braking is applied and where trailer braking is not applied during vehicle stability control (VSC) activity, according to one or more embodiments shown and described herein.

In embodiments described herein, driving situations including a vehicle coupled to a trailer are considered. That is, VSC systems are generally designed for vehicles not coupled to a trailer. However, vehicles that are coupled to a trailer and subject to situations such as those described above may experience amplified side slip as the momentum of the trailer coupled to the vehicle may generate greater side slip power than a vehicle that is not coupled to a trailer. FIG. 2, described below, provides a more detailed example through a scenario of a vehicle including the systems described herein compared to a vehicle not enabled with the systems and methods described herein.

Embodiments of the present disclosure utilize VSC system functionality to provide control of trailer brake output circuits in response to activation of a VSC system.

Figure 1:
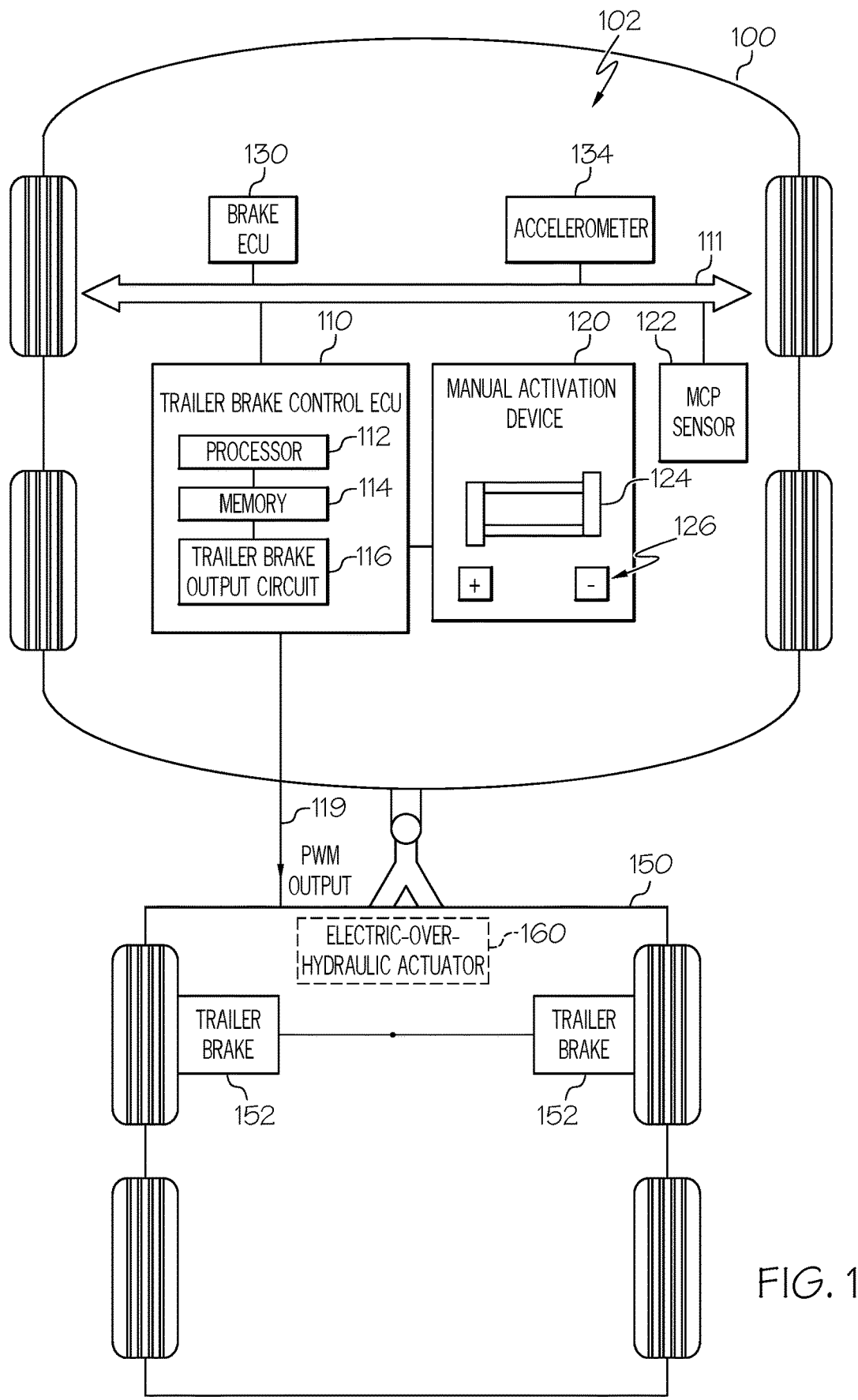
FIG. 1 schematically depicts a vehicle including a trailer brake control system coupled to a trailer including trailer brakes, according to one or more embodiments shown and described herein.

Referring now to FIG. 1, an embodiment of a towing vehicle 100 including a system 102 for controlling an application of a plurality of trailer brakes 152 of a trailer 150 connected to the towing vehicle 100 is schematically depicted. The towing vehicle 100 may be an automobile or any other passenger or non-passenger vehicle such as, for example, a truck, a tractor, or a tractor truck.

The trailer 150 may be any unpowered vehicle including one or more wheels capable of being pulled by the towing vehicle 100 such as, for example, a recreational trailer, a utility trailer, a boat trailer, a semi-trailer, and the like. As depicted in FIG. 1, the plurality of trailer brakes 152 includes two trailer brakes 152, one coupled to each wheel of the front axle. However, it should be understood that in other embodiments, the plurality of trailer brakes 152 may include more than two trailer brakes 152, such as in embodiments in which the plurality of trailer brakes 152 includes multiple axles with two trailer brakes 152 associated with each axle. In some embodiments in which the trailer 150 employs an electric-over-hydraulic braking system, the plurality of trailer brakes 152 may be a plurality of hydraulic trailer brakes and the trailer 150 may include an electric-over-hydraulic actuator 160 that receives an electrical activation signal from the system 102 and transforms the received electrical activation signal to a hydraulic pressure that activates the plurality of hydraulic trailer brakes, as will be described in further detail below. In embodiments in which the trailer 150 employs an electric braking system, the plurality of trailer brakes 152 may be a plurality of electric trailer brakes and the trailer 150 may not include the electric-over-hydraulic actuator 160.

The system 102 includes a communication path 111, a trailer brake control electronic control unit (ECU) 110, a brake ECU 130, an accelerometer 134, a manual activation device 120, and a master cylinder pressure (MPC) sensor 122. The trailer brake control ECU 110 includes one or more processors 112, one or more memory modules 114, and a trailer brake output circuit 116. The various components of the system 102 and the interaction thereof will be described in detail below.

The communication path 111 may be formed from any medium that is capable of transmitting a signal such as, for example, conductive wires, conductive traces, optical waveguides, or the like. Moreover, the communication path 111 may be formed from a combination of mediums capable of transmitting signals. In one embodiment, the communication path 111 comprises a combination of conductive traces, conductive wires, connectors, and buses that cooperate to permit the transmission of electrical data signals to components such as processors, memories, sensors, input devices, output devices, and communication devices. Accordingly, the communication path 111 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 111 communicatively couples the various components of the system 102. As used herein, the term "communicatively coupled" means that coupled components are capable of exchanging data signals with one another such as, for example, electrical signals via conductive medium, electromagnetic signals via air, optical signals via optical waveguides, and the like.

The trailer brake control ECU 110 receives input from other ECUs (e.g., the brake ECU 130, the manual activation device 120, and/or the master cylinder pressure (MCP) sensor 122, and outputs a trailer brake output signal 119, e.g., a pulse-width modulation signal, based on the received input. In some embodiments, the trailer brake control ECU 110 may include logic configured to ramp up the trailer brake output signal 119 from 0% braking force or a vehicle stability control offset value to a target value over a predefined period of time. That is, the trailer brake control ECU 110 may determine the rate at which the trailer brake output signal 119 may change based on a control group setting and/or the target value. To configure the rate at which the trailer brake output signal 119 may change during ramp up and/or ramp down, the trailer brake control ECU 110 may adjust the predefined period of time over which the ramp up and/or ramp down occurs. The trailer brake control ECU 110, upon configuring the trailer brake output signal according to desired ramp characteristics, outputs a final trailer brake output signal 119 for controlling the trailer brakes 152 of the trailer 150.

The trailer brake control ECU 110 may determine the ramp up and/or ramp down profile based on one or more inputs of other vehicle systems. In some embodiments, a user may preselect a ramp up and/or ramp down profile based on the type, size, weight or other features of the trailer 150 being pulled by the towing vehicle 100. In some embodiments, the trailer brake control ECU 110 may automatically select a ramp up and/or ramp down profile based on one or more other vehicle conditions such as whether the trailer brake control system is set to automatic or manual, an anti-lock braking system or a dynamic braking system is active, a hill assist output function is active, a vehicle stability control system is active, or the like. The selection and configuration of the ramp up and/or ramp down profile by the trailer brake control ECU 110 is selected such that smooth stable maneuverability of the vehicle may be maintained.

Each of the one or more processors 112 of the trailer brake control ECU 110 may be any device capable of executing machine readable instructions. Accordingly, each of the one or more processors 112 may be a controller, an integrated circuit, a microchip, a computer, or any other computing device. The one or more processors 112 are communicatively coupled to the other components of the system 102 by the communication path 111. Accordingly, the communication path 111 may communicatively couple any number of processors with one another, and allow the components coupled to the communication path 111 to operate in a distributed computing environment. Specifically, each of the components may operate as a node that may send and/or receive data.

Each of the one or more memory modules 114 of the system 102 is coupled to the communication path 111 and communicatively coupled to the one or more processors 112. The one or more memory modules 114 may comprise RAM, ROM, flash memories, hard drives, or any device capable of storing machine readable instructions such that the machine readable instructions can be accessed and executed by the one or more processors 112. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 114. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 1, the trailer brake output circuit 116 is coupled to the communication path 111 and communicatively coupled to the one or more processors 112. In embodiments in which the trailer 150 employs an electric trailer braking system, the trailer brake output circuit 116 is electrically coupled to the plurality of trailer brakes 152 by a conductive medium, such as a conductive wire. In embodiments in which the trailer 150 employs an electric-over-hydraulic braking system, the trailer brake output circuit 116 is electrically coupled to the electric-over-hydraulic actuator 160 by a conductive medium, such as a conductive wire. The trailer brake output circuit 116 is controlled by the one or more processors 112 and supplies a trailer brake output signal, such as a voltage or current, directly to the plurality of trailer brakes 152 (in embodiments in which the trailer 150 employs an electric braking system) or to the electric-over-hydraulic actuator 160 (in embodiments in which the trailer 150 employs an electric-over-hydraulic braking system) via the conductive medium when commanded by the one or more processors 112. The trailer brake output signal 119 may be controlled based on one or more signals output by the manual activation device 120, a signal output by the MCP sensor 122, and/or one or more signals output by the brake ECU 130, the accelerometer 134, and/or another input device such as a steering wheel (e.g., a steering wheel sensor configured to capture the rate and angle of rotation of the steering wheel). In some embodiments, the trailer brake output circuit 116 may supply current from the power system of the towing vehicle 100. The trailer brake output circuit 116 generally includes one or more electrical components, such as resistors, capacitors, transistors, inductors, and the like. In some embodiments, the trailer brake output circuit 116 may include at least one power transistor, such as a MOSFET transistor.

Still referring to FIG. 1, in some embodiments, the trailer brake output circuit 116 outputs a trailer brake output signal 119 in response to a pulse-width modulated trailer brake output command signal having a duty cycle. In such embodiments, the trailer brake output circuit 116 may generate the trailer brake output signal in proportion to the duty cycle of the pulse-width modulated trailer brake output command signal. However, it should be understood that in other embodiments, the trailer brake output circuit 116 may output the trailer brake output signal in response to a trailer brake output command signal having a waveform other than a pulse-width modulated waveform.

Still referring to FIG. 1, the manual activation device 120 includes a slider 124 and gain pushbuttons 126. The manual activation device 120 is configured to output a signal including a position of the slider 124 and activation of the gain pushbuttons 126. In some embodiments, the output signal of the manual activation device 120 is received by the trailer brake control ECU 110, which may generate a trailer brake output signal with the trailer brake output circuit 116 based on the position of the slider 124 and/or a system gain determined based on activation of the gain pushbuttons 126. A driver of the towing vehicle 100 may demand greater trailer brake control output by increasing the gain set by the slider 124 and/or the gain pushbuttons 126.

Still referring to FIG. 1, the master cylinder pressure (MCP) sensor 122 is coupled to the communication path 111 and communicatively coupled to the trailer brake control ECU 110. The trailer brake control ECU 110 may control the trailer brake output circuit 116 based on a master cylinder pressure determined by the brake ECU 130 based on an output of the MCP sensor 122. A driver of the towing vehicle 100 may demand greater trailer brake control output by pressing the brake pedal, which is sensed by the MCP sensor 122.

The brake ECU 130 is communicatively coupled to the communication path 111. The brake ECU 130 is configured to control activation of the vehicle brakes. The brake ECU 130 may also be configured to control activation of the vehicle stability control of the vehicle and to transmit vehicle side slip signals to other components of the towing vehicle 100 via the communication path 111. The vehicle side slip signals may indicate the availability of braking based on lateral G-signals from an accelerometer 134 (e.g., indicating tire side slip). The brake ECU 130 may set or deactivate a VSC flag when the VSC system is active or not active, respectively. The brake ECU 130 may be configured to transmit a vehicle stability control (VSC) flag indicating that a VSC mode is active or a VSC flag indicating that a VSC mode is inactive to the trailer brake control ECU 110. As discussed above, VSC systems can assist with maneuvering a vehicle in situations such as, for example, oversteering (OS), turning the steering wheel suddenly, taking a turn too quickly, skidding on low friction roads such as wet or icy road, or the like. In general, VSC systems help control side slips of a vehicle.

The trailer brake control ECU 110 operates under a VSC mode or non-VSC mode based on the VSC flag received from the brake ECU 130. The brake ECU 130 may include one or more processors similar to one or more processors 112 of the trailer brake control ECU 110 and one or more memory modules similar to one or memory modules 114 of the trailer brake control ECU 110.

The accelerometer 134 is a device configured to generate an output signal proportional to vehicle acceleration or deceleration. In some embodiments, zero point logic may be employed to the accelerometer 134 value to decrease variability in the sensor value, such as by determining an accelerometer value when a driver is judged to begin braking (e.g., based on master cylinder pressure), and then determining future accelerometer values relative to the accelerometer value when the driver began braking or a sudden steering maneuver. The brake ECU 130 may include one or more processors similar to one or more processors 112 of the trailer brake control ECU 110 and one or more memory modules similar to one or memory modules 114 of the trailer brake control ECU 110.

Referring now to FIG. 2, a comparative example between situations where trailer braking is applied during a VSC triggered condition and where trailer braking is not applied during a VSC triggered condition is depicted. For example, vehicle 200 (200A) is coupled to trailer 210 (210A) and is initially moving in the direction of arrow 214. When the vehicle 200 (200A) makes a lane change or an sudden left steering wheel turn, for example, as indicated by path 212, the momentum of the trailer 210 (210A) can cause or increase a moment 216 thereby pushing the vehicle 200 (200A). However, as depicted in the situation including vehicle 200 and trailer 210 when the vehicle detects a side slip condition and activates the VSC system, the trailer braking ECU may cause a braking force to be applied to the trailed brakes indicated by arrow 218 thereby reducing the pushing effect of the trailer 210 on the vehicle 200 and reducing the magnitude of the moment 216. Alternatively, in the situation including vehicle 200A and trailer 210A no braking force is applied to the trailer 210A causing the vehicle 200A to experience a larger moment 216 and potentially compromising the stability of the vehicle 200A, for example increasing the possibility of a jackknife.

FIG. 2 depicts only one example embodiment where activation of the VSC system may be rendered ineffective or at least compromised by the unfettered momentum of the trailer 210 (210A) pushing on the vehicle 200 (200A). Embodiments described herein are intended to assist the VSC system of a vehicle 200 (200A) when pulling a trailer 210 (210A) by reducing the moment 216 caused or amplified by the momentum of the trailer 210 (210A).

Figure 3:
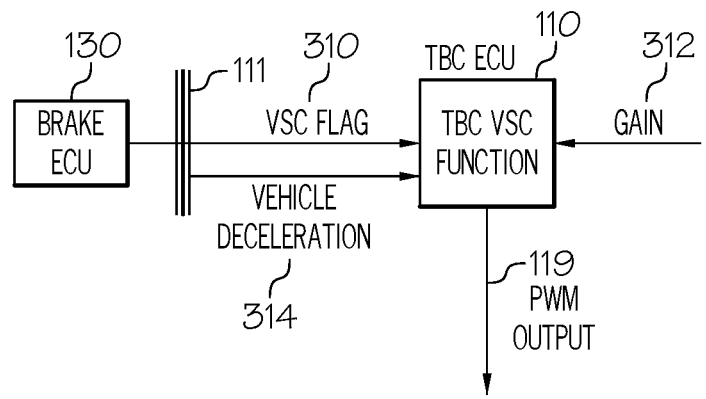
FIG. 3 schematically depicts operations of a trailer brake control electronic control unit (ECU) when a vehicle stability control (VSC) flag is activated, according to one or more embodiments shown and described herein.
Figure 5:
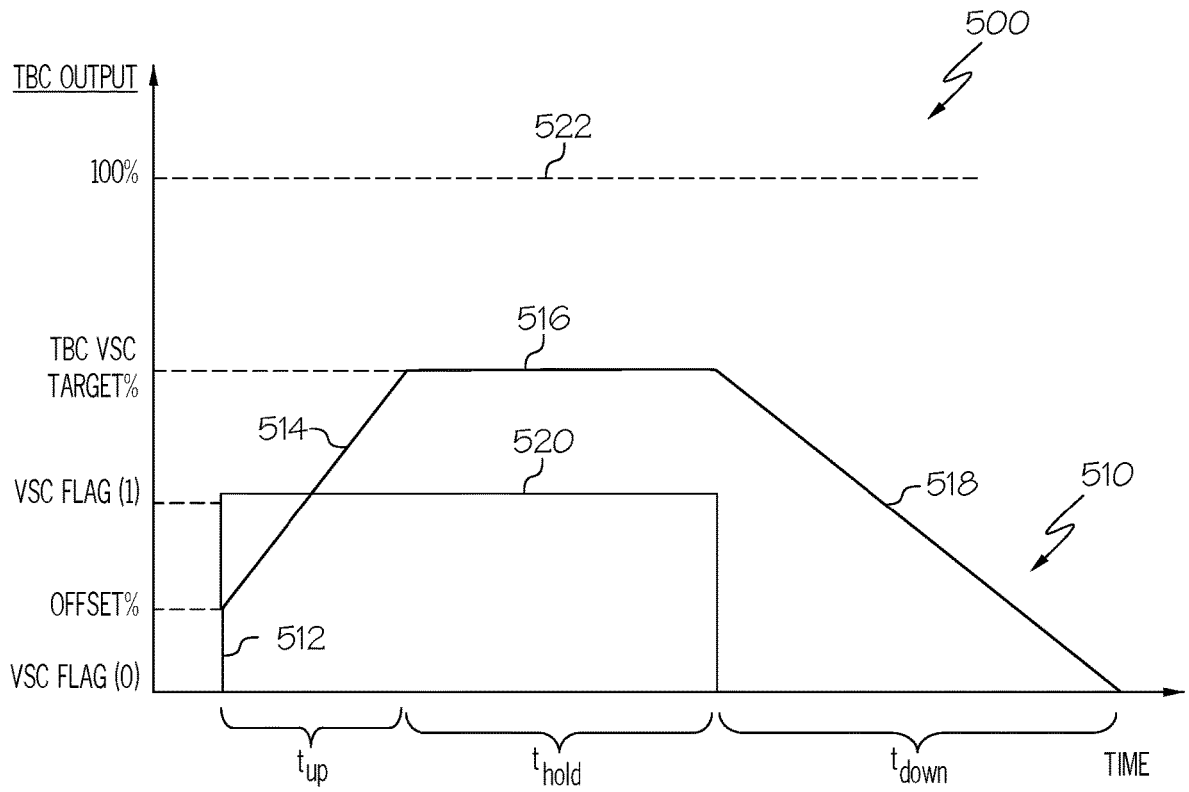
FIG. 5 depicts a graph illustrating the output of a trailer brake control when the VSC function is activated, according to one or more embodiments shown and described herein.

FIG. 3 schematically depicts operations of a trailer brake control ECU 110 when a vehicle stability control (VSC) flag 310 is activated. The trailer brake control vehicle stability control (TBC VSC) function reduces the moment caused by the trailer during a side slip, oversteer, or similar sudden maneuvering event of the vehicle towing a trailer. In some embodiments, when the VSC flag 310 is activated, the operation of trailer brakes is smooth and prevents abrupt motion. In embodiments, the trailer brake control ECU 110 receives a VSC flag 310 indicating that a vehicle VSC mode is ON from the brake ECU 130. When the VSC mode is ON, the trailer brake control ECU 110 outputs a trailer brake output signal 119 based on a TBC VSC function. For example, as shown in FIG. 5, when the VSC mode is ON (i.e., VSC Flag (1) 520), the trailer brake output signal 510 begins to ramp up from an initial value to a target value.

The TBC VSC function target output (e.g., the trailer brake output signal 119 as a PWM signal) can be determined in part as a function of a gain 312 that may be received from the manual activation device 120. In some embodiments, the gain 312 may be pre-stored in the one or more memory modules 114 of the trailer brake control ECU 110. In embodiments, the gain may be adjustable from 0 to 10, in increments of 0.5. For example, a gain of 0 will have no output and a gain of 10 will have a PWM output of 100–X %, where the X % may be predefined or based on the target value determined by the TBC VSC function. However, a different gain range and/or an increment value may be used for gain settings.

Figure 4A:
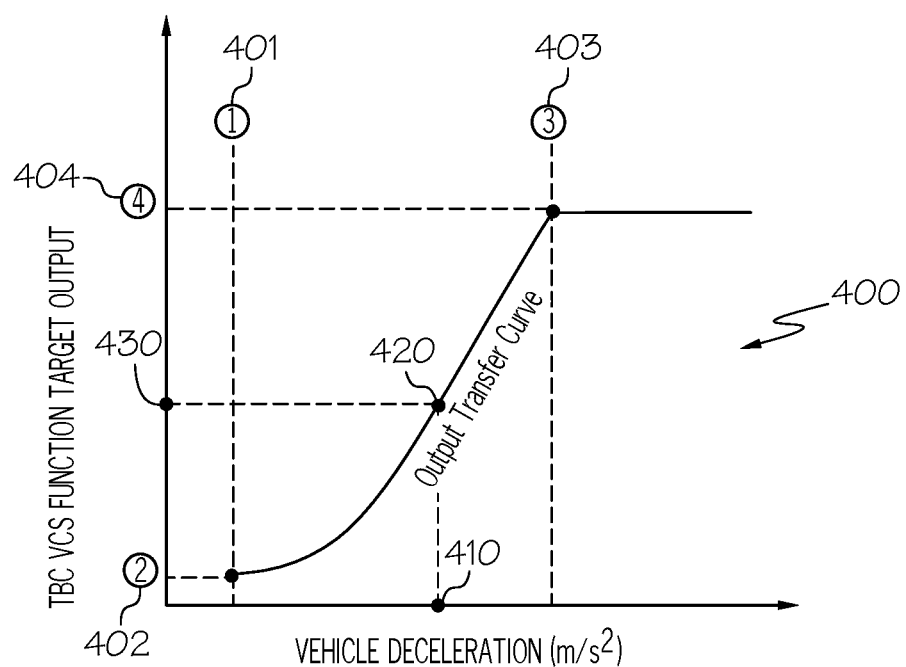
FIG. 4A depicts an output transfer curve for setting a trailer brake control (TBC) VSC target output value, according to one or more embodiments shown and described herein.

In some embodiments, the TBC VSC function implemented by the trailer brake control ECU 110 may output a trailer brake output signal 119 based on a vehicle deceleration signal 314, having for example longitudinal G and/or lateral G components communicated from the accelerometer 134 or a similar device to the trailer brake control ECU 110. FIG. 4A depicts an example output transfer curve which may be utilized by the TBC VSC function to determine the target value (e.g., TBC VSC target % (516, FIG. 5)) for the trailer brake output signal 119.

Referring to FIG. 4A an output transfer curve 400 for setting a TBC VSC target output is depicted. The example output transfer curve 400 depicts an input origin offset value 401 corresponding to an output origin offset 402. In some embodiments, this point of the output transfer curve 400 may align with the origin having values of 0 m/s$^2$ of deceleration and a corresponding TBC VSC target of 0% for the output of the TBC VSC function. However, more practically, the TBC ECU and brake ECU may not be functional until an initial amount of vehicle deceleration (e.g., a value equal to or greater than the input origin offset value 401) is detected. For example, values below the initial amount of vehicle deceleration may be negligible decelerations or may be addressed solely by the vehicle braking system and not require trailer braking to assist. In other words, for an initial vehicle deceleration there may be a corresponding initial non-zero target value (e.g., the value associated with the output origin offset 402) for the output of the TBC VSC function. Furthermore, the output transfer curve 400 includes a maximum deceleration 403 corresponding to the maximum (i.e., 100%) output 404 for the trailer brake control output.

By way of an example, if the vehicle deceleration is determined to be a first value 410, then the corresponding point 420 on the output transfer curve may be identified and the target value 430 for the output of the TBC VSC function may be set. In other words, the output transfer curve 400 depicts a relationship between the available braking output for the trailer brake output circuit and the vehicle deceleration in a VSC active scenario. In general, the available braking force is reduced due to lateral slip as depicted with respect to FIG. 4B.

Figure 4B:
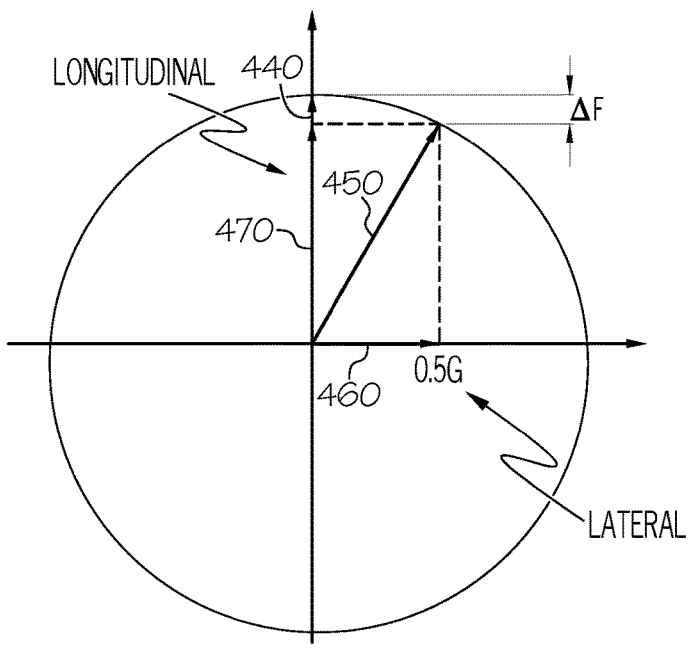
FIG. 4B depicts a lateral G and a longitudinal G in a tire friction circle of a vehicle, according to one or more embodiments shown and described herein.

For example, in FIG. 4B a tire friction circle having lateral G and longitudinal G components is depicted. For a vehicle traveling straight without loss of tire friction, the peak force is vehicle force 440. When traveling in direction of force vector 450, the maximum vehicle force without resulting in tire side slip is depicted having components lateral G 460 and longitudinal G 470. For example, the maximum possible lateral G for a vehicle without slipping may be about 0.5G. This maximum possible lateral G consumption during VCS function may be considered to determine the amount of available braking force in the longitudinal direction. Thus, a brake force related to force vector 450 may include a longitudinal G 470 being ΔF of the peak vehicle (braking) force 440 for a vehicle in traveling in a straight longitudinal direction.

For example without limitation, if the trailer brake control ECU 110 receives a signal that the VSC flag is set (e.g., in response to a signal from an input device such as the MCP sensor 122, a steering wheel, an accelerometer signal or the like indicating a presence or potential for side slip), the trailer brake control ECU 110 determines that the a driver is in the loop. That is, the stability of the vehicle may be compromised; therefore, the trailer brake control may need to assist the VSC system to provide improved maneuverability of the vehicle to the driver.

When a driver is in the loop, the trailer brake control ECU 110 determines a target value for the trailer brake output signal 119 (e.g., the PWM output), which may be the maximum allowable output, target value 430 as shown in FIG. 4A. The target value 430 may be a maximum amount that is determined based on the gain setting according to an input into the manual activation device 120 (FIG. 1). The target value 430 also be determined based on the maximum available longitudinal G force 470 to avoid slip. In some embodiments, the target value 430 is a predetermined value stored in one or more of the memory modules. As such, in some embodiments, a tire friction circle such as the example tire friction circle depicted in FIG. 4B may be used to determine the target value.

Figure 6:
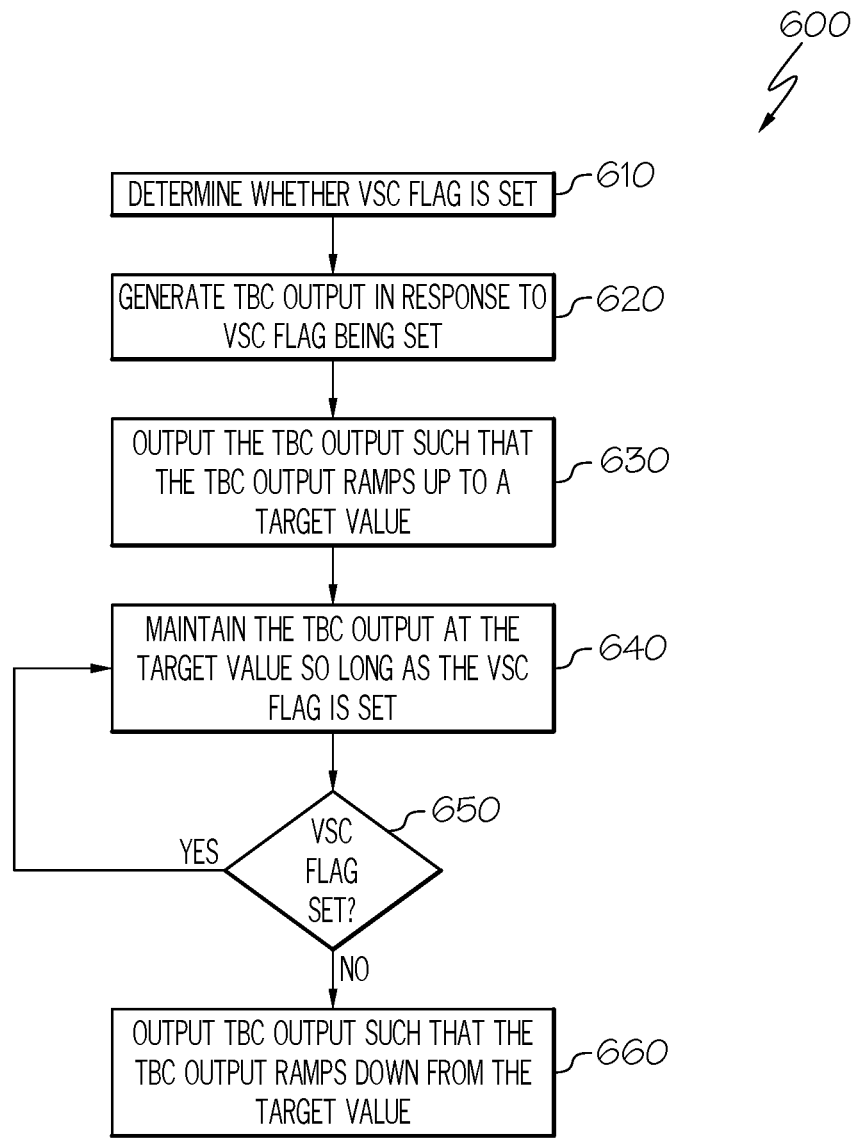
FIG. 6 depicts a flowchart of a method for controlling a trailer brake output circuit, according to one or more embodiments shown and described herein.

FIGS. 5 and 6 will now be discussed together to further describe the operation of the system, vehicle, and method disclosed herein. FIG. 5 depicts a graph 500 illustrating the output of a trailer brake control when the VSC system is activated. FIG. 6 depicts a flowchart of a method for controlling a trailer brake output circuit. As described above herein, a vehicle may activate the VCS system in the event of a variety of situations such as, for example, oversteering (OS), turning the steering wheel suddenly, taking a turn too quickly, skidding on low friction roads such as wet or icy road, or the like. The VSC system may be activated by in response to a signal from an input device such as one or more sensors, including for example, the MCP sensor 122, the accelerometer 134, a steering wheel through a steering wheel sensor, or the like. In general, VSC systems help control side slips of a vehicle by controlling braking and power delivered to the one or more wheels. Some VSC systems may precisely control the brakes of one or more vehicle wheels and in some situations adjust the output of the engine to one or all of the wheels. The precise control of the brakes and engine output to one or more of the wheels may counteract the side slip may generating power opposite the side slip. Overall, the VSC system makes the vehicle more stable and/or maneuverable for a driver.

However, vehicles that are coupled to a trailer and subject to situations such as those described above may experience amplified side slip as the momentum of the trailer coupled to the vehicle generates greater side slip power than a vehicle that is not coupled to a trailer.

The graph in FIG. 5 depicts a trailer brake output signal 510 as a function of time when the VCS system is activated. As discussed above, when the VSC system is active a VSC flag 520 is set. At block 610, an ECU, for example but not limited to the trailer brake control ECU 110, may determine whether the VSC flag 520 is set based on a received signal. The signal may be generated by the brake ECU 130 or another ECU of the vehicle. At block 620, once the VSC flag 520 is determined to be set, the trailer brake control ECU 110 may generate a trailer brake output signal 510 in response. The trailer brake output signal 510 may be defined as having a target value based the TBC VSC function (e.g., as described above). The trailer brake output signal 510 may further be defined by an offset value 512, and a ramp up function. The ramp up function may define a predefined period of time, $t_{up}$, where the trailer brake output signal 510 will ramp up in trailer braking activation power from the offset value 512 to the target value 516. At block 630, the trailer brake control ECU 110 outputs the trailer brake output signal 510 such that the trailer brake output signal 510 includes a ramp up portion 514 over the predefined period of time, $t_{up}$. The ramp up portion 514 may be defined by the trailer brake control ECU 110 as described above. The ramp up portion 514 of the trailer brake output signal 510 is configured to ease the trailer brakes into the activation so that there is a smooth, non-jerky or abrupt, reduction in the trailer's momentum and thus a reduction in the pushing effect of the trailer 150 on the towing vehicle 100 and otherwise the potential amplification of the moment the VSC system is configured to overcome.

Once the trailer brake output signal 510 reaches the target value 516, at block 640, an ECU (e.g., the trailer brake control ECU 110) maintains the trailer brake output signal 510 at the target value so long as the VSC flag 520 remains set. The trailer brake control ECU 110 may be configured to periodically and/or continuously check the status of the VSC flag 520 at block 650. When it is determined that the VSC flag 520 is no longer set at block 650, then the ECU (e.g., the trailer brake control ECU 110) may configure the trailer brake output signal 510 to begin to ramp down from the target value 516. For example, as depicted in FIG. 5, when the VSC flag 520 value changes from (1) to (0) the trailer brake output signal 510 begins to ramp down.

The ramp down portion 518 of the trailer brake output signal 510 can be critical since the momentum of the trailer may not have been completed stopped during the trailer braking during the $t_{up}$ and $t_{hold}$ periods. Without a ramp down portion 518, a sudden release of the activation of the trailer brakes 152 may adversely affect the assistance provided to the driver by the VSC system. For example, the sudden release of the activation of the trailer brakes 152 may result in an unsmooth transition out of an oversteer maneuver or the result of another maneuver leading to a subsequent activation of the VSC system. Such a transition may cause a driver to react or worse overreact to the sudden change in force from the trailer on the towing vehicle 100 and again enter a maneuver causing activation of the VSC system. In other words, the ramp down portion 518 of the trailer brake output signal 510 allows the towing vehicle 100 to regain pulling control over the trailer 150 and synchronize momentum of the connected vehicles (i.e., the towing vehicle 100 and the trailer 150).

The ramp up portion 514 and the ramp down portion 518 of the trailer brake output signal 510 may be configured with the same predefined period of time value or different values. The trailer brake control ECU 110 or another ECU may determine the values for the predefined period of time based on characteristics of the towing vehicle 100, the trailer 150, and/or a combination of both. For example, characteristics of the towing vehicle 100 and trailer 150 may include the weight, size, aerodynamics, tire size, tire style, center of gravity, or the like.

It should now be understood that embodiments described herein provide systems for controlling trailer brake output circuits when a VSC flag is set. By controlling the trailer brake output circuits through a ramp up, hold, and ramp down sequence smooth and assistive trailer braking may be achieved during a maneuver requiring the VSC system. That is, the trailer braking activation may reduce the momentum and the magnitude of the moment the VSC system is addressing.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for controlling a trailer brake output circuit, the system comprising:
    an electronic control unit comprising:
        one or more processors;
        one or more memory modules communicatively coupled to the one or more processors;
        the trailer brake output circuit communicatively coupled to the one or more processors, wherein the trailer brake output circuit is configured to output a trailer brake output signal; and
        machine readable instructions stored in the one or more memory modules that cause the electronic control unit to perform at least the following when executed by the one or more processors:
            receive a signal from a vehicle stability control system, the signal indicating that a vehicle stability control flag is set;
            generate the trailer brake output signal in response to the vehicle stability control flag being set such that the trailer brake output signal ramps up to a target value over a predefined period of time;
            maintain the trailer brake output signal at the target value while the vehicle stability control flag is set; and
            output the trailer brake output signal such that the trailer brake output signal ramps down from the target value when the vehicle stability control flag changes from set to not set.

2. The system of claim 1, wherein the target value is a predetermined value stored in the one or more memory modules.

3. The system of claim 1, further comprising a manual activation device communicatively coupled to the electronic control unit, the manual activation device configured to transmit a gain for the trailer brake output signal to the electronic control unit.

4. The system of claim 3, wherein the machine readable instructions stored in the one or more memory modules cause the electronic control unit to activate a trailer brake control vehicle stability control function, wherein the target value is determined by the trailer brake control vehicle stability control function based on the gain received from the manual activation device.

5. The system of claim 1, wherein the machine readable instructions stored in the one or more memory modules cause the electronic control unit to activate a trailer brake control vehicle stability control function, wherein the target value is determined by the trailer brake control vehicle stability control function based on at least one of a longitudinal G-signal or a lateral G-signal received from an accelerometer.

6. The system of claim 1, wherein the predefined period of time is about 0.5 seconds to 5 seconds.

7. The system of claim 1, wherein the trailer brake output signal ramps up from a vehicle stability control offset value to the target value over the predefined period of time.

8. A vehicle for controlling a trailer brake output circuit, the vehicle comprising:
    the trailer brake output circuit configured to output a trailer brake output signal; and
    an electronic control unit configured to:
        receive a signal from a vehicle stability control system, the signal indicating that a vehicle stability control flag is set;
        generate the trailer brake output signal in response to the vehicle stability control flag being set such that the trailer brake output signal ramps up to a target value over a predefined period of time;
        maintain the trailer brake output signal at the target value while the vehicle stability control flag is set; and
        output the trailer brake output signal such that the trailer brake output signal ramps down from the target value when the vehicle stability control flag changes from set to not set.

9. The vehicle of claim 8, wherein the target value is a predetermined value stored in one or more memory modules of the electronic control unit.

10. The vehicle of claim 8, further comprising a manual activation device communicatively coupled to the electronic control unit, the manual activation device configured to transmit a gain for the trailer brake output signal to the electronic control unit.

11. The vehicle of claim 10, wherein the electronic control unit to is configured to activate a trailer brake control vehicle stability control function, wherein the target value is determined by the trailer brake control vehicle stability control function based on the gain received from the manual activation device.

12. The vehicle of claim 8, wherein the electronic control unit is configured to activate a trailer brake control vehicle stability control function, wherein the target value is determined by the trailer brake control vehicle stability control function based on at least one of a longitudinal G-signal or a lateral G-signal received from an accelerometer.

13. The vehicle of claim 8, wherein the predefined period of time is about 0.5 seconds to 5 seconds.

14. The vehicle of claim 8, wherein the trailer brake output signal ramps up from a vehicle stability control offset value to the target value over the predefined period of time.

15. A method of controlling a trailer brake output circuit of a vehicle, the method comprising:
    receiving a signal from a vehicle stability control system, the signal indicating that a vehicle stability control flag is set;
    generating, by an electronic control unit of the vehicle, a trailer brake output signal in response to the vehicle stability control flag being set such that the trailer brake output signal ramps up to a target value over a predefined period of time;
    maintaining, by the electronic control unit of the vehicle, the trailer brake output signal at the target value while the vehicle stability control flag is set; and outputting, by the electronic control unit of the vehicle, the trailer brake output signal such that the trailer brake output signal ramps down from the target value when the vehicle stability control flag changes from set to not set.

16. The method of claim 15, wherein the target value is a predetermined value stored in one or more memory modules of the electronic control unit.

17. The method of claim 15, further comprising receiving a gain signal from a manual activation device communicatively coupled to the electronic control unit, the manual activation device configured to transmit a gain for the trailer brake output signal to the electronic control unit.

18. The method of claim 15, further comprising activating a trailer brake control vehicle stability control function, wherein the target value is determined by the trailer brake control vehicle stability control function based on at least one of a longitudinal G-signal or a lateral G-signal received from an accelerometer.

19. The method of claim 15, wherein the predefined period of time is about 0.5 second to 5 seconds.

20. The method of claim 15, wherein the trailer brake output signal ramps up from a vehicle stability control offset value to the target value over the predefined period of time.

* * * * *